United States Patent
Masuhara et al.

(10) Patent No.: US 10,277,339 B2
(45) Date of Patent: Apr. 30, 2019

(54) MEASURING APPARATUS AND MEASURING METHOD

(71) Applicant: ANRITSU CORPORATION, Atsugi-shi (JP)

(72) Inventors: Keita Masuhara, Atsugi (JP); Takahiro Kasagi, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 0 days.

(21) Appl. No.: 15/817,676

(22) Filed: Nov. 20, 2017

(65) Prior Publication Data

US 2018/0269998 A1    Sep. 20, 2018

(30) Foreign Application Priority Data

Mar. 14, 2017 (JP) ................. 2017-048271

(51) Int. Cl.
| | |
|---|---|
| *H04B 17/23* | (2015.01) |
| *H04B 17/10* | (2015.01) |
| *H04W 24/08* | (2009.01) |
| *H04B 17/30* | (2015.01) |

(52) U.S. Cl.
CPC ............ *H04B 17/30* (2015.01); *H04B 17/23* (2015.01); *H04W 24/08* (2013.01)

(58) Field of Classification Search
CPC ...... H04B 17/30; H04B 17/23; H04B 17/101; H04B 3/46; H04B 17/0085; H04W 24/08
See application file for complete search history.

(56) References Cited

U.S. PATENT DOCUMENTS

| | | | | |
|---|---|---|---|---|
| 9,955,371 | B1* | 4/2018 | Koebele | H04W 24/06 |
| 2003/0163266 | A1* | 8/2003 | Ward | G01R 13/0245 |
| | | | | 702/67 |
| 2008/0155354 | A1* | 6/2008 | Kolman | G01R 31/318314 |
| | | | | 714/45 |
| 2010/0324855 | A1* | 12/2010 | Parker | G06F 11/2294 |
| | | | | 702/119 |
| 2012/0136603 | A1* | 5/2012 | Ishikawa | G01R 31/31919 |
| | | | | 702/85 |

(Continued)

FOREIGN PATENT DOCUMENTS

| | | |
|---|---|---|
| JP | 2000224184 A | 8/2000 |
| JP | 2014-504053 | 2/2014 |

*Primary Examiner* — Andrew Wendell
(74) *Attorney, Agent, or Firm* — Greer Burns & Crain Ltd.

(57) ABSTRACT

A measuring apparatus 10 includes: a transmission and reception unit 12 which wirelessly communicates with devices 1 to 3 under test (DUTs); a measurement unit 13 which receives data from the DUTs through the transmission and reception unit 12, measures the DUTs based on the received data and outputs measurement results; a display unit 15 which displays predetermined information regarding the measurement; a disconnection related information acquisition unit 24 which, on the condition that a connection state of the wireless communication has been changed to a disconnected state, acquires disconnection related information including information indicating a reason for changing to the disconnected state and information on a state immediately before the disconnected state; and a display control unit 14 which performs control to display the disconnection related information on the display unit 15.

10 Claims, 5 Drawing Sheets

(56) References Cited

U.S. PATENT DOCUMENTS

| | | | |
|---|---|---|---|
| 2013/0163445 A1* | 6/2013 | Majumdar | H04L 43/50 |
| | | | 370/252 |
| 2013/0328581 A1* | 12/2013 | Lee | G01R 31/31924 |
| | | | 324/750.01 |
| 2016/0170631 A1* | 6/2016 | Kolbeck | G06F 3/04855 |
| | | | 715/771 |
| 2017/0013009 A1* | 1/2017 | Xie | H04L 63/1433 |
| 2017/0289192 A1* | 10/2017 | Allison | H04W 12/08 |
| 2017/0307678 A1* | 10/2017 | Diegmann | G01R 31/2808 |
| 2017/0315206 A1* | 11/2017 | Leibfritz | G01R 27/28 |

* cited by examiner

| | TIME | DUT ADDRESS | FINAL STATE | REASON FOR DISCONNECTION | DATA RATE |
|---|---|---|---|---|---|
| 34 → | 2017/02/14 11:15 52 | 01-23-45-67-89-9a | Connected | Deauthentication by Tester | |
| 33 → | 2017/02/14 11:15 51 | 00-01-23-45-67-89 | Authenticated | Connection refusal by DUT | |
| 32 → | 2017/02/14 11:14 52 | 00-00-01-23-45-67 | Connected | Disassociation by DUT | |
| 31 → | 2017/02/14 11:13 52 | 01-23-45-67-89-9a | Connected | Deauthentication by Tester | |

FIG.4

MEASURING APPARATUS AND MEASURING METHOD

BACKGROUND OF THE INVENTION

1. Field of the Invention

The present invention relates to measuring apparatuses and measuring methods for measuring wireless communication characteristics of a device under test (DUT) using, for example, wireless communication technologies.

2. Description of the Background Art

As a measuring apparatus of this type, a test system for testing a wireless data packet transmitter/receiver as a DUT is known (for example, see JP-A-2014-504053).

The conventional system described in JP-A-2014-504053 includes a transmitter, a receiver, and a controller/processor for testing the DUT.

By controlling the transmitter and the receiver, the controller/processor withholds transmissions of acknowledgment signals until after a predetermined number of valid data packets have been captured from the DUT, until a predetermined time interval has passed, or until valid data packets at a predetermined number of data transfer rates have been captured from the DUT.

With this configuration, the conventional system can decrease the time required to perform a test without eliminating the necessary steps or compromising the integrity of the test.

SUMMARY OF THE INVENTION

However, for example, when the wireless connection is disconnected in the conventional test system during the interconnection sequence with a device under test (DUT), in order to investigate the cause thereof, it was necessary to capture and save in a file all the communication frames transmitted and received to and from the DUT, and then perform a complicated process of decoding and analyzing the file. Therefore, there has been a demand for a measuring apparatus that enables a user to easily grasp the state of wireless communication with the DUT.

The present invention has been made in view of the above circumstances, and an object thereof is to provide a measuring apparatus and a measuring method that enable a user to easily grasp the state of wireless communication with a DUT.

A measuring apparatus according to claim 1 of the present application includes: a wireless communication unit which wirelessly communicates with at least one DUT; a measurement unit which receives data from the at least one DUT through the wireless communication unit, measures the at least one DUT based on the received data and outputs measurement results; a display device which displays predetermined information regarding the measurement; an information acquisition unit which, on the condition that a connection state of the wireless communication has changed to a predetermined state, acquires, from the wireless communication unit, state change related information including information indicating the predetermined state and information on an address of the DUT relating to the wireless communication of which the communication state has changed; and a display control unit which performs control to display the state change related information on the display device for each of the DUTs.

With this configuration, the measuring apparatus according to claim 1 of the present application displays the state change related information on the display device for each DUT, on the condition that the connection state of the wireless communication has changed to the predetermined state, so that the user can easily grasp the state of wireless communication with the DUT.

In the measuring apparatus according to claim 2 of the present application, the predetermined state is a state in which the wireless communication is disconnected; the information acquisition unit, on the condition that the disconnection of the wireless communication has been detected, acquires disconnection related information including information indicating a reason for the disconnection of the wireless communication, information indicating a connection state immediately before the disconnection, and information on a device under test's address immediately before the disconnection as the state change related information; and the display control unit performs control to display the disconnection related information on the display device for each of the DUTs in which the disconnection has been detected.

With this configuration, the measuring apparatus according to claim 2 of the present application displays the disconnection related information for each of the DUTs in which the disconnection has been detected, on the condition that the disconnection of the wireless communication with the DUT has been detected, so that the user can easily grasp the state of wireless communication with the DUT.

In the measuring apparatus according to claim 3 of the present application, the information acquisition unit is capable of acquiring connection state information indicating the connection state of the wireless communication, and the display control unit performs control to display the connection state information on the display device.

With this configuration, the measuring apparatus according to claim 3 of the present application acquires the connection state information indicating the connection state of the wireless communication and displays the connection state information, so that the user can easily grasp the state of wireless communication with the DUT.

In the measuring apparatus according to claim 4 of the present application, the information acquisition unit acquires the connection state information including information on a data rate in the wireless communication.

With this configuration, the measuring apparatus according to claim 4 of the present application acquires and displays the information on the data rate in the wireless communication, so that the measuring apparatus can be preferably used for measurement of the DUT in which the data rate varies during wireless communication.

In the measuring apparatus according to claim 5 of the present application, the display control unit performs control to floatingly display the state change related information on a display screen of the display device.

With this configuration, the measuring apparatus according to claim 5 of the present application can floatingly display the state change related information while displaying the measurement conditions and the measurement results, so that the visibility in displaying the measurement conditions and the measurement results can be improved.

A measuring method according to claim 6 of the present application includes: a wireless communication step of wirelessly communicating with at least one DUT; a measurement step of receiving data from the at least one DUT in the wireless communication step, measuring the at least one DUT based on the received data, and outputting measurement results; an information acquisition step of, on the condition that a connection state of the wireless communication has changed to a predetermined state, acquiring state change related information including information indicating the predetermined state and information on an address of the DUT relating to the wireless communication of which the communication state has changed; and a display control step of performing control to display the state change related information on a display device for each of the DUTs.

With this configuration, the measuring method according to claim 6 of the present application includes, on the condition that the connection state of the wireless communication with the DUT has changed to the predetermined state, displaying the state change related information on the display device, so that the user can easily grasp the state of wireless communication with the DUT.

In the measuring method according to claim 7 of the present application, the predetermined state is a state in which the wireless communication is disconnected; in the information acquisition step, on the condition that the disconnection of the wireless communication has been detected, disconnection related information including information indicating a reason for the disconnection of the wireless communication, information indicating a connection state immediately before the disconnection, and information on the address of the DUT immediately before the disconnection as the state change related information is acquired; and in the display control step, control is performed to display the disconnection related information on the display device for each of the DUTs in which the disconnection has been detected.

With this configuration of the measuring method according to claim 7 of the present application, on the condition that the disconnection of the wireless communication with the DUT has been detected, the disconnection related information is displayed for each of the DUTs in which the disconnection has been detected, so that the user can easily grasp the state of wireless communication with the DUT.

In the measuring method according to claim 8 of the present application, in the information acquisition step, connection state information indicating the connection state of the wireless communication is acquired, and in the display control step, control is performed to display the connection state information on the display device.

With this configuration of the measuring method according to claim 8 of the present application, the connection state information indicating the connection state of the wireless communication is acquired to display the connection state information, so that the user can easily grasp the state of wireless communication with the DUT.

In the measuring method according to claim 9 of the present application, in the information acquisition step, the connection state information including information on a data rate in the wireless communication is acquired.

With this configuration of the measuring method according to claim 9 of the present application, the information on the data rate in the wireless communication is acquired and displayed, so that the measuring method can be preferably used for measurement of the DUT in which the data rate varies during wireless communication.

In the measuring method according to claim 10 of the present application, in the display control step, control is performed to floatingly display the state change related information on a display screen of the display device.

With this configuration of the measuring method according to claim 10 of the present application, the state change related information can be floatingly displayed while the measurement conditions and the measurement results are displayed, so that the visibility in displaying the measurement conditions and the measurement results can be improved.

The present invention can provide a measuring apparatus and a measuring method having an advantageous effect that a user can easily grasp the state of wireless communication with a DUT.

BRIEF DESCRIPTION OF THE DRAWINGS

FIG. 4 is a diagram illustrating disconnection related information at the time of disconnection in accordance with an embodiment of the present invention.

DETAILED DESCRIPTION OF THE INVENTION

Hereinafter, embodiments of the present invention will be described with reference to the drawings.

First, the configuration of a measuring apparatus according to an embodiment of the present invention will be described.

Figure 1:
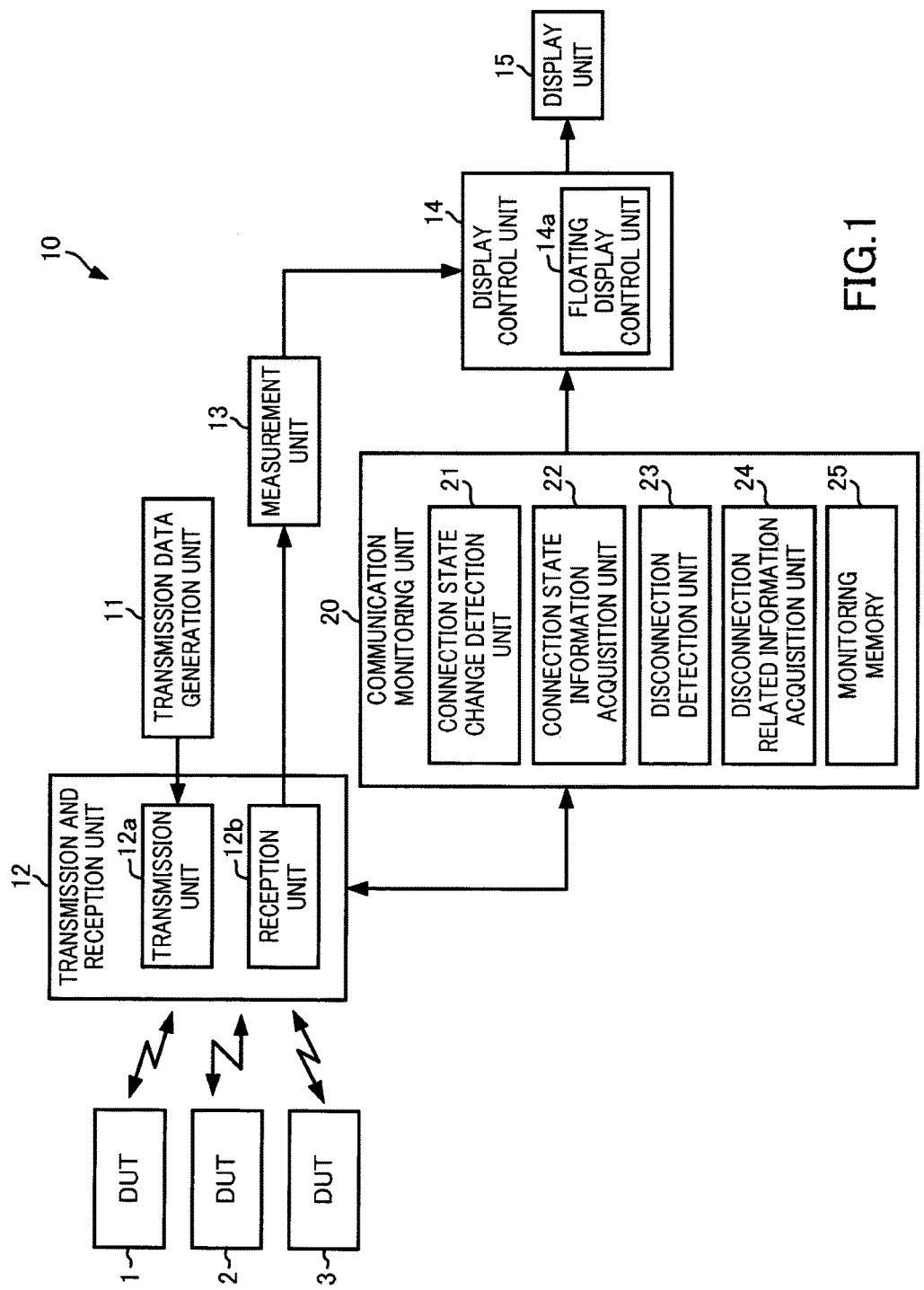
FIG. 1 is a block diagram of a measuring apparatus in accordance with an embodiment of the present invention.

As shown in FIG. 1, the measuring apparatus 10 in the embodiment measures the wireless communication characteristics, specifically, the transmission characteristics or the reception characteristics, or both thereof of devices under test (DUTs) 1 to 3 by wirelessly communicating with the DUTs 1 to 3. It should be noted that the number of the DUTs is not limited to three, and may be one or more.

The measuring apparatus 10 includes a transmission data generation unit 11, a transmission and reception unit 12, a measurement unit 13, a communication monitoring unit 20, a display control unit 14, and a display unit 15. The measuring apparatus 10 includes a microcomputer that includes a central processing unit (CPU), a read only memory (ROM), a random access memory (RAM), an input/output circuit to which various interfaces are connected, and the like. The measuring apparatus 10 causes the microcomputer to function as each functional unit of the measuring apparatus 10 by executing a control program stored in the ROM in advance.

The transmission data generation unit 11 includes a signal generator for generating data of a predetermined signal pattern in order to perform reception measurement for evaluating reception performance of the DUT 1, for example. In accordance with an instruction signal from an operation unit (not shown) operated by a user, the transmission and reception unit 12 packetizes the generated data of the predetermined signal pattern, transmits the packetized data (packets) to the DUT 1, and receives a response signal from the DUT 1. The same applies to the DUTs 2 and 3.

The transmission and reception unit 12 includes a transmission unit 12a and a reception unit 12b, and establishes a wireless communication connection with the DUTs 1 to 3, for example, based on a communication standard conforming to Institute of Electrical and Electronics Engineers (IEEE) 802.11. In addition, after establishing the wireless communication connection, the transmission and reception unit 12 transmits and receives various measurement-related data to and from the DUTs 1 to 3.

Although not shown, the transmission unit 12a includes a modulation circuit, a digital-to-analog converter (DAC), an up-converter, a transmission antenna, and the like. The transmission unit 12a performs transmission processing such as digital modulation and up-conversion on the transmission data generated by the transmission data generation unit 11, and transmits them to the DUTs 1 to 3 via the transmission antenna.

Although not shown, the reception unit 12b includes a receiving antenna, a down-converter, an analog-to-digital converter (ADC), a demodulation circuit, and the like. The reception unit 12b receives signals from the DUTs 1 to 3 via the receiving antenna, performs reception processing such as down-conversion and demodulation, and outputs data obtained by the processing to the measurement unit 13.

The measurement unit 13 receives the data obtained by the reception unit 12b, measures transmission characteristics or reception characteristics, or both thereof of the DUTs 1 to 3 based on the measurement conditions set by the user operating the operation unit (not shown), and outputs the measurement result data to the display control unit 14.

Specifically, the measurement unit 13 can measure, for example, transmission powers, Error Vector Magnitudes (EVMs), constellations, and the like as the transmission characteristics of the DUTs 1 to 3. In addition, the measurement unit 13 can measure, for example, reception sensitivities, frame error rates, and the like as the reception characteristics of the DUTs 1 to 3.

The communication monitoring unit 20 is connected to the transmission and reception unit 12 and monitors wireless communication between the transmission and reception unit 12 and the DUTs 1 to 3 by polling or reception of an event. Further, the communication monitoring unit 20 includes a connection state change detection unit 21, a connection state information acquisition unit 22, a disconnection detection unit 23, a disconnection related information acquisition unit 24, and a monitoring memory 25.

The connection state change detection unit 21 is configured to detect whether or not the connection state of the wireless communication between the transmission and reception unit 12 and the DUTs 1 to 3 has changed to a predetermined state.

The connection state information acquisition unit 22 is configured to, on the condition that changing to the predetermined state has been detected by the connection state change detection unit 21, acquire state change related information including information indicating the predetermined state and information on an address of the DUT relating to the wireless communication of which the communication state has changed. Further, during the connection of the wireless communication between the transmission and reception unit 12 and the DUTs 1 to 3, the connection state information acquisition unit 22 acquires, for example, information on a connection state of the measuring apparatus 10 side, an address of the DUT wirelessly connected to the measuring apparatus 10, a data rate, and the like. The connection state information acquisition unit 22 is an example of an information acquisition unit.

The disconnection detection unit 23 is configured to detect disconnection of the wireless communication between the transmission and reception unit 12 and the DUTs 1 to 3.

When the disconnection of the wireless communication is detected by the disconnection detection unit 23, the disconnection related information acquisition unit 24 refers to logs stored in the monitoring memory 25 and acquires information on the disconnection. The disconnection related information acquisition unit 24 is an example of the information acquisition unit.

The monitoring memory 25 is configured to store the logs of messages exchanged between the transmission and reception unit 12 and the DUTs 1 to 3 in a time-series manner.

The display control unit 14 is configured to control the display of predetermined information to be shown on the display unit 15. In addition, the display control unit 14 includes a floating display control unit 14a which performs display control to floatingly display the predetermined information on the display unit 15.

The display unit 15 is configured to display the predetermined information according to the display control by the display control unit 14. The display unit 15 is an example of the display device.

Figure 2:
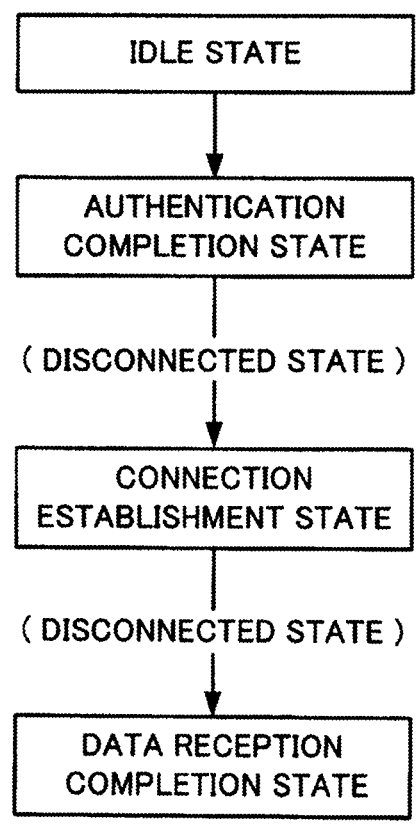
FIG. 2 is an exemplary diagram illustrating transitions of connection states in wireless communication between a transmission and reception unit of the measuring apparatus and a DUT in accordance with an embodiment of the present invention.

Next, functions of the connection state change detection unit 21, the connection state information acquisition unit 22, the disconnection detection unit 23, and the disconnection related information acquisition unit 24 of the communication monitoring unit 20 will be specifically described with reference to FIG. 2. FIG. 2 shows an example of transitions of connection states in the wireless communication between the transmission and reception unit 12 and the DUTs 1 to 3.

The connection state change detection unit 21 is configured to detect each state shown in FIG. 2. That is, the connection state change detection unit 21 detects each of the connection states when the connection state transitions from an idle state to an authentication completion state in which the authentication is completed, when the connection state subsequently transitions to a connection establishment state in which the connection is established, and when the connection state transitions to a data reception completion state in which the reception of data for measurement from the DUT is completed.

When the authentication completion state shown in FIG. 2, for example, is detected by the connection state change detection unit 21, the connection state information acquisition unit 22 acquires state change related information including information indicating that the state has transitioned to the authentication completion state and information on an address of the DUT wirelessly connected to the measuring apparatus 10. In addition, the connection state information acquisition unit 22 acquires a connection state of the measuring apparatus 10 side, information on the address of the connected DUT, a data rate and the like in the wireless communication with the DUTs between two states shown in FIG. 2, for example, between the connection establishment state and the data reception completion state.

The disconnection detection unit 23 is configured to detect disconnection of the wireless communication indicated in parentheses in FIG. 2. Specifically, there may be a disconnection state in which the wireless communication is disconnected for some reason between the authentication completion state and the connection establishment state, or between the connection establishment state and the data reception completion state. The disconnection detection unit 23 detects these disconnection states.

On the condition that the disconnection of the wireless communication is detected by the disconnection detection unit 23, the disconnection related information acquisition unit 24 refers to the logs stored in the monitoring memory 25 to acquire disconnection related information including information indicating a reason for the disconnection and information on a connection state immediately before the disconnection.

Each state shown in FIG. 2 is an exemplary state, and any connection states can be defined by the user in advance. Other states not shown in FIG. 2, for example, an authentication start state, an authentication in-progress state, an authentication failure state, a connection establishment in-progress state, a connection establishment failure state, and the like may be defined.

Next, a case where disconnection of wireless communication is detected by the disconnection detection unit 23 of the communication monitoring unit 20 will be described with reference to FIGS. 3 and 4.

Figure 3:
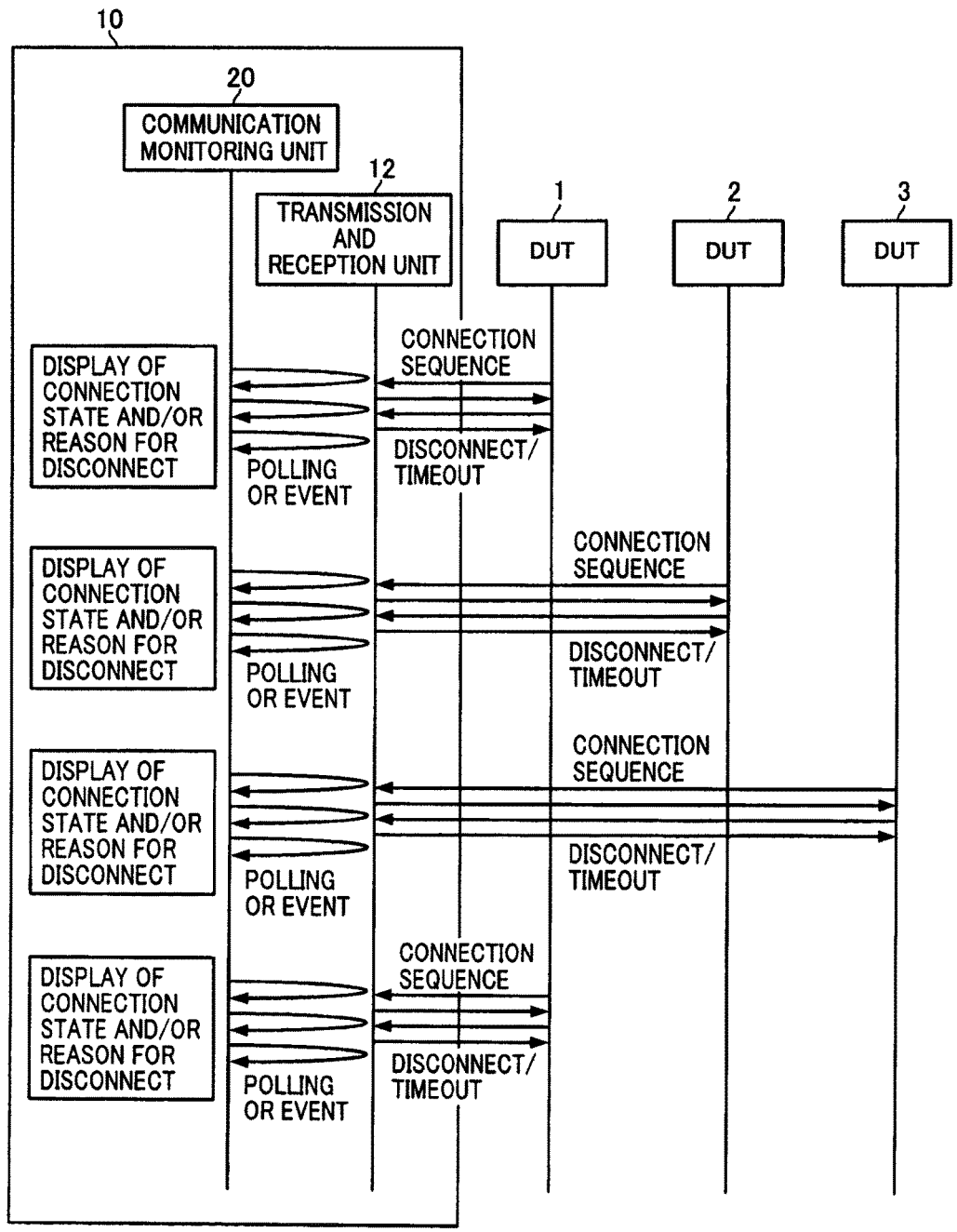
FIG. 3 is a diagram illustrating that the measuring apparatus has wirelessly communicated sequentially with each DUT in accordance with an embodiment of the present invention.

FIG. 3 shows that the measuring apparatus 10 has wirelessly communicated sequentially with the DUT 1, the DUT 2, the DUT 3, and the DUT 1. In addition, FIG. 3 shows that there were some causes leading to the disconnections of the wireless communication during the first wireless communication with the DUT 1, during the second wireless communication with the DUT 2, and during the third wireless communication with the DUT 3. In FIG. 3, the wireless communication shown at the top is the oldest and the wireless communication shown at the bottom is the newest.

The communication monitoring unit 20 acquires information on a state of connection or a reason for disconnection by polling to the transmission and reception unit 12 or reception of an event.

Specifically, when disconnection of wireless communication is detected by the disconnection detection unit 23 of the communication monitoring unit 20, the disconnection related information acquisition unit 24 refers to the logs stored in the monitoring memory 25 to acquire disconnection related information 31 to 34 as state change related information at the time of the disconnection, as shown in FIG. 4, for example. The disconnection related information 31 to 34 shown in FIG. 4 is information to be displayed on the display unit 15 under the display control by the display control unit 14.

As shown in FIG. 4, the disconnection related information 31 to 34 includes information about a time when the disconnection of wireless communication occurred, a DUT's address immediately before the disconnection, a final state indicating the connection state immediately before the disconnection, a reason for the disconnection, and a data rate. In FIG. 4, the disconnection related information 31 shown at the bottom is the oldest, and the disconnection related information 34 shown at the top is the newest. The DUTs indicated by the DUTs' addresses of the disconnection related information 31 to 34 are DUT 1, DUT 2, DUT 3, and DUT 1, respectively.

The disconnection related information 31 indicates that the wireless communication with the DUT 1 was disconnected at the displayed time. The final state in this case is "Connected", which shows that the wireless communication connection with the DUT 1 existed immediately before the disconnection. The reason for the disconnection is "Deauthentication by Tester", which indicates that the wireless communication was disconnected by disconnection notification by the measuring apparatus 10.

The disconnection related information 32 indicates that the wireless communication with the DUT 2 was disconnected at the displayed time. In this case, the final state is "Connected", which shows that the wireless communication connection with the DUT 2 existed immediately before the disconnection. Moreover, the disconnection reason is "Disassociation by DUT", which indicates that the wireless communication was disconnected by the DUT 2.

The disconnection related information 33 indicates that the wireless communication with the DUT 3 was disconnected at the displayed time. The final state in this case is "Authenticated", which shows that the authentication process was completed between the measuring apparatus 10 and the DUT 3 just before the disconnection. Further, the reason for the disconnection is "Connection refusal by DUT", which indicates that the connection was refused by the DUT 3.

The disconnection related information 34 indicates that the wireless communication connection with the DUT 1 was again performed after the disconnection of the wireless communication with the DUT 3 and the wireless communication with the DUT 1 was disconnected at the displayed time. The final state in this case is "Connected", which shows that the wireless communication connection with the DUT 1 existed immediately before the disconnection. The reason for the disconnection is "Deauthentication by Tester", which indicates that the wireless communication was disconnected by disconnection notification by the measuring apparatus 10.

In data rate sections shown in FIG. 4, data rates of wireless communication between the DUTs and the measuring apparatus 10 are displayed in real time in the state of being in wireless communication. However since these cases show the states after disconnection, nothing is displayed in the data rate sections. In the state of being in wireless communication, information of each state including the data rate, acquired by the connection state information acquisition unit 22, is displayed in sections shown in FIG. 4 in line while being updated every time the changing of the connection state is detected by the connection state change detection unit 21.

Further, it is preferable that the display control unit 14 floatingly displays the disconnection related information 31 to 34 shown in FIG. 4 by the floating display control unit 14a by superimposing the disconnection related information 31 to 34 on numerical information or graphs showing the measurement result. By the floatingly displaying, the measuring apparatus 10 can display the disconnection related information 31 to 34 while displaying the measurement conditions and the measurement results on the display unit 15, and thus improving the visibility in displaying the measurement conditions and the measurement results.

As described above, as shown in FIG. 4, when the disconnection of the wireless communication is detected, the measuring apparatus 10 in the embodiment displays the disconnection related information 31 to 34, so that the user can easily grasp the reason for the disconnection of the wireless communication with the DUTs. Further, when the wireless communication is being performed, the measuring apparatus 10 according to the embodiment displays information on connection states, data rates, and the like of the wireless communication, so that the user can easily grasp the information thereof.

Figure 5:
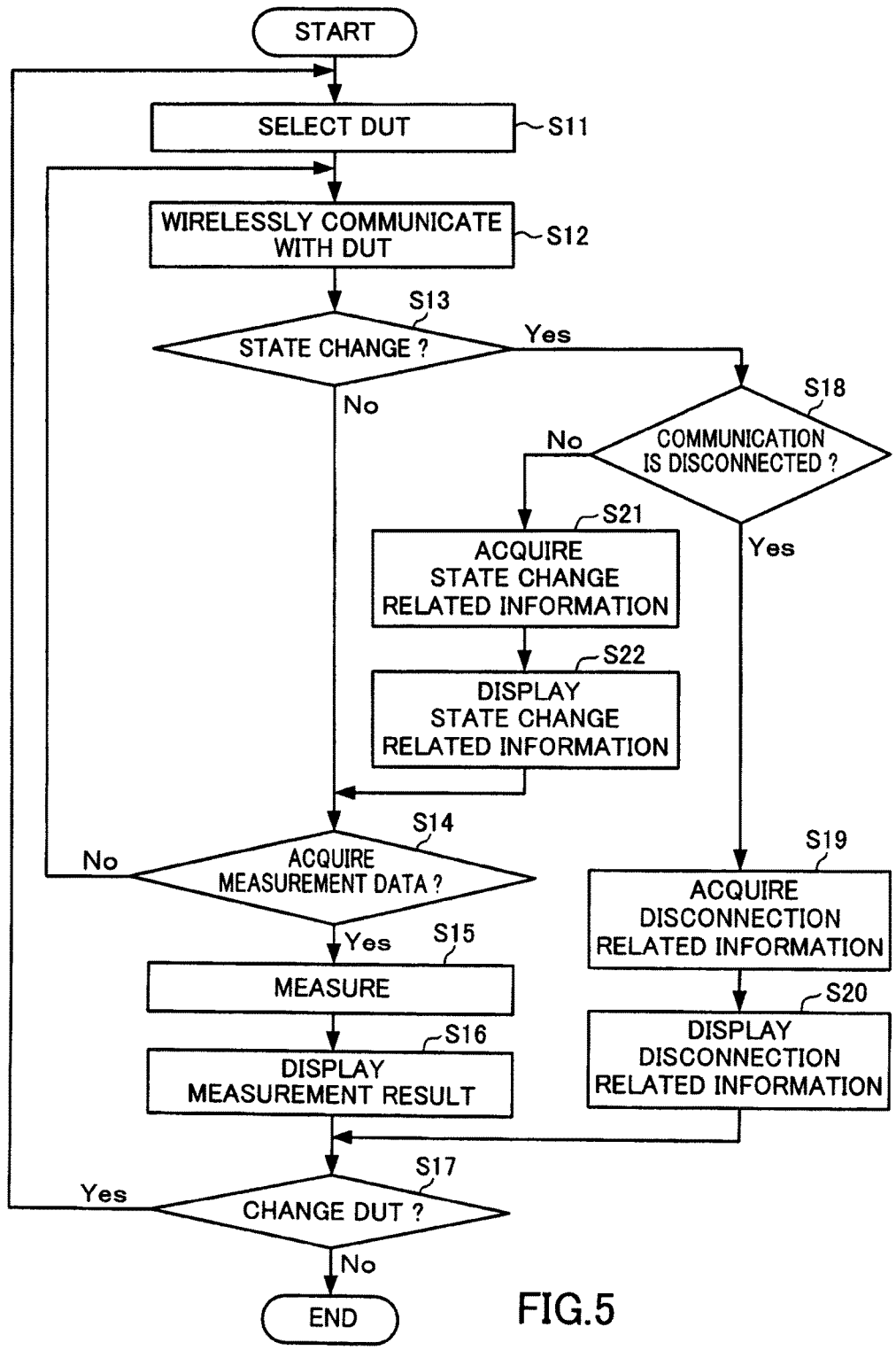
FIG. 5 is a flowchart illustrating the operation of the measuring apparatus in accordance with an embodiment of the present invention.

Next, the operation of the measuring apparatus 10 according to the embodiment will be described with reference to the flowchart of FIG. 5.

The transmission and reception unit 12 selects one of the DUTs 1 to 3 according to an instruction signal from the operation unit (not shown) operated by the user (step S11).

The transmission and reception unit 12 starts wireless communication with the selected DUT (DUT 1 assumed) based on a communication standard conforming to IEEE 802.11, for example (step S12).

The communication monitoring unit 20 monitors the wireless communication between the transmission and reception unit 12 and the DUT 1, and the connection state change detection unit 21 determines whether or not the connection state of the wireless communication has changed to a predetermined state (step S13).

In the step S13, when it is determined that the connection state of the wireless communication has not changed, the reception unit 12b determines whether or not measurement data for measuring the transmission characteristics of the DUT 1, for example, has been received (step S14).

When it is determined in the step S14 that the measurement data has not been received, the process returns to the step S12.

When it is determined in the step S14 that the measurement data has been received, the measurement unit 13 measures the wireless communication characteristics of the DUT 1 using the measurement data received by the reception unit 12b (step S15).

The display control unit 14 performs display control to display the measurement results obtained by the measurement unit 13 on the display unit 15, and the display unit 15 displays the measurement results according to the display control by the display control unit 14 (step S16).

The transmission and reception unit 12 determines whether or not to change the DUT 1 to another DUT according to an instruction signal from the operation unit (not shown) operated by the user (step S17).

When it is determined in the step S17 that the DUT is to be changed, the process returns to the step S11. When it is not determined to change the DUT, the process is terminated.

When it is determined in the step S13 that the connection state of the wireless communication has changed, the disconnection detection unit 23 determines whether or not disconnection of the wireless communication has occurred (step S18).

When it is determined in the step S18 that disconnection of the wireless communication has occurred, the disconnection related information acquisition unit 24 refers to the logs stored in the monitoring memory 25 to acquire disconnection related information (step S19), and outputs the acquired disconnection related information to the display control unit 14.

The display control unit 14 performs control to display the inputted disconnection related information on the display unit 15 (step S20). As a result, the disconnection related information as shown in FIG. 4, for example, is displayed on the display unit 15.

When it is not determined in the step S18 that disconnection of the wireless communication has occurred, that is, in the state in which the wireless communication is being performed, information on each state detected by the connection state change detection unit 21 is acquired as the state change related information instead of the disconnection related information as shown in FIG. 4 (step S21). The acquired state change related information is outputted to the display control unit 14.

The display control unit 14 performs control to display the inputted state change related information on the display unit 15 (step S22). As a result, in the state in which the wireless communication is being performed, the measuring apparatus 10 enables the user to easily grasp the information on each state, the data rate, and the like.

In particular, displaying the data rate in the state of being in the wireless communication is preferable for measurement of a DUT whose data rate changes during the wireless communication.

As described above, the measuring apparatus 10 according to the embodiment displays the state change related information on the display unit 15 in real time on the condition that it is detected that the connection state of the wireless communication with the DUT has changed to the predetermined state, so that the user can easily grasp the state of wireless communication with the DUT.

In particular, in the state in which the wireless communication with the DUT is disconnected, the measuring apparatus 10 according to the embodiment displays the disconnection related information in real time for each DUT in which disconnection has been detected, so that the user can easily grasp the reason for the disconnection of wireless communication with the DUT.

As described above, the measuring apparatus and the measuring method according to the present invention have an advantageous effect that the user can easily grasp the state of wireless communication with DUTs, and are useful, for example, as a measuring apparatus or a measuring method for measuring wireless communication characteristics of the DUTs by using wireless communication technologies.

What is claimed is:

1. A measuring apparatus comprising:
   a wireless communication unit which wirelessly communicates with at least one device under test;
   a measurement unit which receives data from the at least one device under test through the wireless communication unit, measures the at least one device under test based on the received data and outputs measurement results;
   a display device which displays predetermined information regarding the measurement;
   an information acquisition unit which, on the condition that a connection state of the wireless communication has changed to a predetermined state, acquires, from the wireless communication unit, state change related information including information indicating the predetermined state and information on an address of the device under test relating to the wireless communication of which the communication state has changed; and
   a display control unit which performs control to display the state change related information on the display device for each of the devices under test.

2. The measuring apparatus according to claim 1, wherein:
   the predetermined state is a state in which the wireless communication is disconnected;
   the information acquisition unit, on the condition that the disconnection of the wireless communication has been detected, acquires disconnection related information including information indicating a reason for the disconnection of the wireless communication, information indicating a connection state immediately before the disconnection, and information on a device under test's address immediately before the disconnection as the state change related information; and
   the display control unit performs control to display the disconnection related information on the display device for each of the devices under test in which the disconnection has been detected.

3. The measuring apparatus according to claim 1, wherein the information acquisition unit is capable of acquiring connection state information indicating the connection state of the wireless communication, and the display control unit performs control to display the connection state information on the display device.

4. The measuring apparatus according to claim 3, wherein the information acquisition unit acquires the connection state information including information on a data rate in the wireless communication.

5. The measuring apparatus according to claim 1, wherein the display control unit performs control to floatingly display the state change related information on a display screen of the display device.

6. A measuring method comprising:
- a wireless communication step, performed by a wireless communication unit of a measuring apparatus, of wirelessly communicating with at least one device under test;
- a measurement step, performed by a measurement unit of the measuring apparatus, of receiving data from the at least one device under test in the wireless communication step, measuring the at least one device under test based on the received data, and outputting measurement results;
- an information acquisition step of, on the condition that a connection state of the wireless communication has changed to a predetermined state, acquiring, by an information acquisition unit of the measuring apparatus, state change related information including information indicating the predetermined state and information on an address of the device under test relating to the wireless communication of which the communication state has changed; and
- a display control step, performed by a display control unit of the measuring apparatus, of performing control to display the state change related information on a display device for each of the devices under test.

7. The measuring method according to claim 6, wherein:
- the predetermined state is a state in which the wireless communication is disconnected;
- in the information acquisition step, on the condition that the disconnection of the wireless communication has been detected, disconnection related information including information indicating a reason for the disconnection of the wireless communication, information indicating a connection state immediately before the disconnection, and information on the address of the device under test immediately before the disconnection as the state change related information is acquired; and
- in the display control step, control is performed to display the disconnection related information on the display device for each of the devices under test in which the disconnection has been detected.

8. The measuring method according to claim 6, wherein in the information acquisition step, connection state information indicating the connection state of the wireless communication is acquired, and in the display control step, control is performed to display the connection state information on the display device.

9. The measuring method according to claim 8, wherein in the information acquisition step, the connection state information including information on a data rate in the wireless communication is acquired.

10. The measuring method according to claim 6, wherein in the display control step, control is performed to floatingly display the state change related information on a display screen of the display device.

* * * * *